United States Patent
Tel et al.

(10) Patent No.: US 10,627,722 B2
(45) Date of Patent: Apr. 21, 2020

(54) ETCH-ASSIST FEATURES

(71) Applicant: ASML NETHERLANDS B.V., Veldhoven (NL)

(72) Inventors: Wim Tjibbo Tel, Helmond (NL); Thomas I. Wallow, San Carlos, CA (US)

(73) Assignee: ASML NETHERLANDS B.V., Veldhoven (NL)

(*) Notice: Subject to any disclaimer, the term of this patent is extended or adjusted under 35 U.S.C. 154(b) by 0 days.

(21) Appl. No.: 16/067,343

(22) PCT Filed: Dec. 21, 2016

(86) PCT No.: PCT/EP2016/082227
§ 371 (c)(1),
(2) Date: Jun. 29, 2018

(87) PCT Pub. No.: WO2017/114725
PCT Pub. Date: Jul. 6, 2017

(65) Prior Publication Data
US 2019/0018313 A1    Jan. 17, 2019

Related U.S. Application Data

(60) Provisional application No. 62/273,666, filed on Dec. 31, 2015.

(51) Int. Cl.
*G03B 27/32* (2006.01)
*G03F 7/20* (2006.01)
(Continued)

(52) U.S. Cl.
CPC ............ *G03F 7/70425* (2013.01); *G03F 1/36* (2013.01); *G03F 7/705* (2013.01);
(Continued)

(58) Field of Classification Search
CPC ............. H01L 21/0337; H01L 21/0338; H01L 21/31116; H01L 21/31138; H01L 21/0274;
(Continued)

(56) References Cited

U.S. PATENT DOCUMENTS 5,229,872 A    7/1993    Mumola
5,296,891 A    3/1994    Vogt et al.
(Continued)

OTHER PUBLICATIONS

International Search Report and Written Opinion issued in PCT Application No. PCT/EP2016/082227, dated Apr. 25, 2017.

*Primary Examiner* — Christina A Riddle
(74) *Attorney, Agent, or Firm* — Pillsbury Winthrop Shaw Pittman, LLP

(57) ABSTRACT

Provided is a process including: obtaining a layout specifying, at least in part, a pattern to be transferred to a substrate via a patterning process and an etch process; and modifying, with one or more processors, the layout to include an etch-assist feature that is larger than a resolution limit of the patterning process and smaller than a resolution limit of the etch process, the etch-assist feature being configured to reduce a bias of the patterning process or the etch process, to reduce an etch induced shift of a feature in the layout due to the etch process, or to expand a process window of another patterning process.

21 Claims, 15 Drawing Sheets

(51) Int. Cl.
*G06F 17/50* (2006.01)
*H01L 21/033* (2006.01)
*G03F 1/36* (2012.01)

(52) U.S. Cl.
CPC ...... *G03F 7/70325* (2013.01); *G03F 7/70433* (2013.01); *G06F 17/5068* (2013.01); *H01L 21/0334* (2013.01); *G03F 7/70441* (2013.01)

(58) Field of Classification Search
CPC .............. H01L 21/308; H01L 21/3083; H01L 21/3086; H01L 21/027; H01L 21/3065; H01L 22/20; H01L 21/0334; H01L 21/28123; H01L 21/311; G03F 1/36; G03F 1/70; G03F 1/80; G03F 1/72; G03F 1/144; G03F 7/70325; G03F 7/70425; G03F 7/70433; G03F 7/70441; G03F 7/70466; G03F 7/70483; G03F 7/70491; G03F 7/705; G03F 7/70525; G03F 7/70533; G03F 7/70541; G03F 7/70991; G03F 7/70625; G03F 7/70558; G03F 7/70641; G03F 7/70616; G06F 17/5068; G06F 17/5081; G06F 2217/12
USPC ........ 355/18, 27, 30, 40, 46, 52, 53, 54, 55, 355/67–71, 77; 700/95, 96, 97, 108, 109, 700/121; 716/50–56; 430/5, 30, 269, 430/270.1, 322, 312, 323, 325, 314, 22, 430/394; 438/689, 705, 710, 717, 735, 438/737, 738, 50, 714, 942, 946, 947, 438/948–949; 216/41, 46, 47, 48, 54; 378/34, 35
See application file for complete search history.

(56) References Cited

U.S. PATENT DOCUMENTS

| | | | |
|---|---|---|---|
| 5,523,193 A | 6/1996 | Nelson | |
| 5,723,234 A * | 3/1998 | Yokoyama | G03F 1/26 430/5 |
| 5,969,441 A | 10/1999 | Loopstra et al. | |
| 6,046,792 A | 4/2000 | Van Der Werf et al. | |
| 6,109,775 A * | 8/2000 | Tripathi | H01L 21/31053 257/E21.244 |
| 6,262,435 B1 * | 7/2001 | Plat | H01L 22/34 257/48 |
| 6,599,665 B1 | 7/2003 | Lin et al. | |
| 2004/0018741 A1 | 1/2004 | Deshmukh et al. | |
| 2004/0217086 A1 | 11/2004 | Kawashima | |
| 2007/0042603 A1 | 2/2007 | Kropewnicki et al. | |
| 2009/0156011 A1 | 6/2009 | Belen et al. | |
| 2009/0157360 A1 | 6/2009 | Ye et al. | |
| 2009/0191711 A1 | 7/2009 | Rui et al. | |
| 2009/0290401 A1 * | 11/2009 | Ouyang | G11C 5/02 365/51 |
| 2011/0091815 A1 | 4/2011 | Dunn et al. | |
| 2011/0138343 A1 | 6/2011 | Granik | |
| 2011/0266032 A1 | 11/2011 | Xie et al. | |
| 2012/0053855 A1 * | 3/2012 | Liao | G06F 17/5081 702/35 |
| 2013/0179847 A1 | 7/2013 | Hansen | |
| 2015/0054168 A1 | 2/2015 | Wells et al. | |
| 2015/0132968 A1 | 5/2015 | Ren et al. | |
| 2015/0249018 A1 | 9/2015 | Park et al. | |
| 2015/0357205 A1 | 12/2015 | Wang et al. | |
| 2016/0062226 A1 * | 3/2016 | Lin | G03F 1/42 430/5 |
| 2017/0004233 A1 * | 1/2017 | Han | G03F 1/36 |

* cited by examiner

ETCH-ASSIST FEATURES

CROSS-REFERENCE TO RELATED APPLICATIONS

This application is the U.S. national phase entry of PCT patent application no. PCT/EP2016/082227, which was filed on Dec. 21, 2016, which claims the benefit of priority of U.S. provisional application No. 62/273,666, which was filed on Dec. 31, 2015, and which are incorporated herein in its entirety by reference.

BACKGROUND

Field

The present invention relates generally to patterning processes and, more specifically, to etch-assist features for patterning processes.

Description of the Related Art

Patterning processes take many forms. Examples include photolithography, electron-beam lithography, imprint lithography, inkjet printing, directed self assembly, and the like. Often these processes are used to manufacture relatively small, highly-detailed components, such as electrical components (like integrated circuits or photovoltaic cells), optical components (like digital mirror devices or waveguides), and mechanical components (like accelerometers or microfluidic devices).

Often patterning processes are followed by various types of subtractive processes, such as dry etches or wet etches. In many cases, the patterning process applies a temporary patterned layer over a layer to be etched, and the temporary patterned layer selectively exposes the underlying layer to the etch, thereby transferring the pattern to the underlying layer. In some cases, various pattern-dependent effects cause etches, and other subtractive processes, to yield non-uniform results across a pattern. These non-uniform results can, in some cases, affect device performance or yield, or serve to impose undesirable constraints on process windows or design choices.

SUMMARY

The following is a non-exhaustive listing of some aspects of the present techniques. These and other aspects are described in the following disclosure.

Some aspects include a process including: obtaining a layout specifying, at least in part, a pattern to be transferred to a substrate via a patterning process and an etch process; and modifying, with one or more processors, the layout to include an etch-assist feature that is larger than a resolution limit of the patterning process and smaller than a resolution limit of the etch process, the etch-assist feature being configured to reduce a bias of the patterning process or the etch process, to reduce an etch induced shift of a feature in the layout due to the etch process, or to expand a process window of another patterning process.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
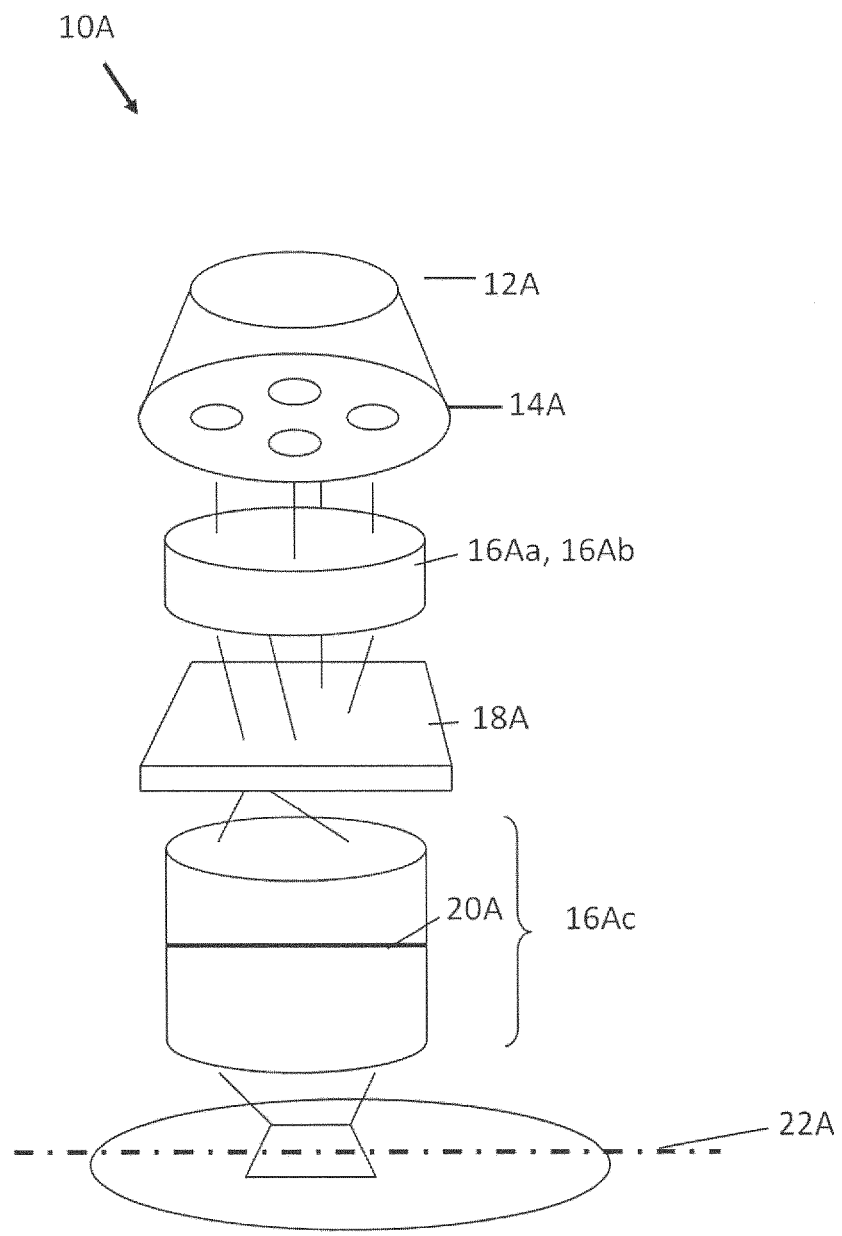
FIG. 1 is a block diagram of a lithography system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of patterning technologies. Indeed, the inventors wish to emphasize the difficulty of recognizing those problems that are nascent and will become much more apparent in the future should trends in the lithography industry, and industries using similar processing techniques, continue as the inventors expect. The difficulty of recognizing these problems is compounded by the cross-disciplinary nature of the problem, spanning lithography and etch processes. Further, because multiple problems are addressed, it should be understood that some embodiments are problem-specific, and not all embodiments address every problem with traditional systems described herein or provide every benefit described herein. That said, improvements that solve various permutations of these problems are described below.

As noted above, various pattern-dependent, undesirable effects may emerge during subtractive processes following patterning processes. Among other phenomena, this includes 1) proximity effects in etch due to microloading of reactants near certain pattern features, and more particularly, uneven proximity effects in different areas of a pattern having different feature densities; and 2) post-patterning, pre-etch film stress (e.g., in resist) that can distort resist sidewalls and lead to overlay error or changes in feature dimensions.

To mitigate these problems, or others, some embodiments supplement a layout specifying a pattern (e.g., a layer of an integrated circuit) to include etch-assist features. In some embodiments, the etch-assist features may be placed near relatively isolated trenches (or other features, like isolated vias) to make local microloading effects for the feature more closely match those of other areas where trenches (or other features) are more densely arranged, potentially yielding a more uniform result across a pattern following etch. Further, in some embodiments, etch-assist features may be placed to interrupt relatively long runs of resist (or other patterned masking material) to relieve film stress, thereby potentially mitigating resulting sidewall distortion in features adjacent the relatively long runs of resist, which is expected to reduce overlay and critical-dimension errors.

These etch-assist features, in some cases, survive patterning processes, but not subsequent subtractive processes. The features, in some embodiments, transfer to resist, transfer to a hardmask during an initial etch (e.g., only partially to the hardmask, for instance, by failing to fully penetrate the hardmask), and then are washed out (e.g., fail to transfer to the underlying layer) as the patterned hardmask is used to mask etching of underlying features. In some embodiments, the etch-assist features are narrow enough to avoid transfer from a hardmask to the underlying layer (e.g., a film or film stack), while being wide enough to transfer during the patterning process.

These techniques are best understood in view of an example of a type of patterning process.

A lithographic projection apparatus can be used, for example, in the manufacture of integrated circuits (ICs). In such a case, a patterning device (e.g., a mask) may specify a pattern corresponding to a layer of the IC ("design layout"), such as a via layer, an interconnect layer, or gate layer, or the like. This pattern, often forming part of a circuit, may be transferred onto a target portion (e.g. one or more dies in an exposure field) on a substrate (e.g., a silicon wafer) that has been coated with a layer of radiation-sensitive material (e.g., "resist"). Transfer techniques include irradiating the target portion through the circuit pattern on the patterning device. Often, a single substrate contains a plurality of adjacent target portions to which the circuit pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the circuit pattern on the patterning device may be transferred to one target portion progressively. Often, the lithographic projection apparatus will have a magnification factor M (generally <1), so the speed F at which the substrate is moved will be a factor M times that at which the projection beam scans the patterning device. More information about examples of some lithographic devices are described, for example, by U.S. Pat. No. 6,046,792, incorporated herein by reference.

A variety of processes may occur before and after exposure. Prior to transferring the pattern from the patterning device to the substrate, the substrate may undergo various procedures, such as priming, resist coating and a soft bake. After exposure, the substrate may be subjected to other procedures, such as a post-exposure bake (PEB), development, a hard bake and measurement/inspection of the transferred circuit pattern. This array of procedures is used as a basis to make an individual layer of a device, e.g., an IC. The substrate may then undergo various processes such as etching, ion-implantation or diffusion (doping), metallization, oxidation, chemical-mechanical polishing, etc., to form a layer of the device. If several layers are required in the device, then variations on this procedure may be repeated for each layer, often with a different pattern specified by a different patterning device at each layer. Eventually, a device may be formed in each target portion on the substrate. These devices may then be separated from one another by a technique such as dicing or sawing, whence the individual devices can be mounted on a carrier, connected to pins, ball-grid arrays, etc. Or some embodiments may encapsulate devices before simulation.

As noted, lithography is a central step in the manufacturing of ICs, where patterns formed on substrates define functional elements of the ICs, such as microprocessors, memory chips etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law." Often, layers of devices are manufactured using lithographic projection apparatuses that project a design layout onto a substrate using illumination from a deep-ultraviolet illumination source, creating individual functional elements having dimensions well below 100 nm, i.e., less than half the wavelength of the radiation from the illumination source (e.g., a 193 nm illumination source).

This process in which features with dimensions smaller than the classical resolution limit of a lithographic projection apparatus are printed, is commonly known as low-k1 lithography, according to the resolution formula $CD=k_1 \times \lambda/NA$, where $\lambda$ is the wavelength of radiation employed (often 248 nm or 193 nm for photolithography), NA is the numerical aperture of projection optics in the lithographic projection apparatus, CD is the "critical dimension"—generally the smallest feature size printed—and k1 is an empirical resolution factor. In general, the smaller k1 the more difficult it becomes to reproduce a pattern on the substrate that resembles the shape and dimensions planned by a circuit designer in order to achieve particular electrical functionality and performance.

To overcome these difficulties, fine-tuning steps are often applied to the lithographic projection apparatus or design layout. These include, for example, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. Examples of "projection optics" include components operating according to any of these design types for directing, shaping or controlling the projection beam of radiation, collectively or singularly. Examples of "projection optics" include optical components in a lithographic projection apparatus, no matter where the optical component is located on an optical path of the lithographic projection apparatus. Projection optics may include optical components for shaping, adjusting or projecting radiation from the source before the radiation passes the patterning device, or optical components for shaping, adjusting or projecting the radiation after the radiation passes the patterning device. The projection optics generally exclude the source and the patterning device.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid crystal display panels, thin film magnetic heads, etc. The skilled artisan will appreciate that, in the context of such alternative applications, any use of the terms "reticle," "wafer," or "die" in this text should be considered as interchangeable with the more general terms "mask," "substrate," and "target portion," respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm). In some embodiments, examples of "radiation" and "beam" also include electrical radiation, such as electron beams or ion beams, by which patterns are transferred.

The term "optimizing" and "optimization" as used herein refers to or means adjusting a lithographic projection apparatus, a lithographic process, etc. such that results or processes of lithography have more desirable characteristics, such as higher accuracy of projection of a design layout on a substrate, a larger process window, etc. Thus, the term "optimizing" and "optimization" as used herein refers to or means a process that identifies one or more values for one or more parameters that provide an improvement, e.g., a local optimum, in at least one relevant metric, compared to an initial set of one or more values for those one or more parameters. These terms do not require identifying a global optimum and can encompasses improvements short of a global optimum. In an embodiment, optimization steps can be applied iteratively to provide further improvements in one or more metrics. Steps in which an error function or loss function is minimized (e.g., reduced to, or at least closer to, a minimum) in an optimizing process should be read as generic to steps in which signs are reversed and a fitness function is maximized (e.g., increased to, or at least closer to, a maximum), and vice versa.

In some embodiments, the lithographic projection apparatus may be of a type having two or more tables (e.g., two or more substrate table, a substrate table and a measurement table, two or more patterning device tables, etc.). In such "multiple stage" devices a plurality of the multiple tables may be used concurrently, or preparatory steps may be carried out on one or more tables while one or more other tables are being used for exposures. Twin stage lithographic projection apparatuses are described, for example, in U.S. Pat. No. 5,969,441, incorporated herein by reference.

The patterning device referred to above may specify some or all of one or more design layouts (e.g., a portion of a design layout for double-patterning, or an entire layout). The design layout can be generated using CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit elements (such as gates, capacitors, etc.), vias, or interconnect lines, so as to reduce the likelihood of the circuit devices or lines interacting with one another in a material, undesirable way. One or more of the design rule limitations may be referred to as "critical dimensions" (CD). A critical dimension of a circuit, in some contexts, refers to the smallest width of a line or hole or the smallest space between two lines or two holes. Thus, the CD determines the overall size and density of the designed circuit. Of course, one of the goals in integrated circuit fabrication is to faithfully reproduce the original circuit design on the substrate (via the patterning device).

The term "mask" or "patterning device" refers to a device that can be used to endow an incoming radiation beam with a patterned cross-section (which may unfold over time, e.g., in scanning or electron-beam lithography), corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means. More information on such mirror arrays can be gleaned, for example, from U.S. Pat. Nos. 5,296,891 and 5,523,193, which are incorporated herein by reference.

a programmable LCD array. An example of such a construction is given in U.S. Pat. No. 5,229,872, which is incorporated herein by reference.

Non-optical patterning devices include an electron beam modulator coupled to a data source for a design layout and configured to spatially modulate the beam according to the layout. Other examples include a mold for imprint lithography and an inkjet printer, e.g., with electrically conductive or insulative ink.

As a brief introduction, FIG. 1 illustrates an example of a lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which define the partial coherence (denoted as sigma) and which may include optics 14A, 16Aa and 16Ab that shape radiation from the source 12A; a patterning device 14A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin (Θmax), n is the Index of Refraction of the media between the last element of projection optics and the substrate, and Θmax is the largest angle of the beam exiting from the projection optics that can still impinge on the substrate plane 22A. The radiation from the radiation source 12A may not necessarily be at a single wavelength. Instead, the radiation may be at a range of different wavelengths. The range of different wavelengths may be characterized by a quantity called "imaging bandwidth," "source bandwidth" or simply "bandwidth," which are used interchangeably herein. A small bandwidth may reduce the chromatic aberration and associated focus errors of the downstream components, including the optics (e.g., optics 14A, 16Aa and 16Ab) in the source, the patterning device and the projection optics. However, that does not necessarily lead to a rule that the bandwidth should never be enlarged.

In an optimization process of a patterning process using a patterning system, a figure of merit of the system can be represented as a cost function. The optimization process may include finding a set of parameters (e.g., design variables and parameter settings) of the system that optimizes (e.g., minimizes or maximizes) the cost function. The cost function can have any suitable form depending on the goal of the optimization. For example, the cost function can be weighted root mean square (RMS) of deviations of certain characteristics (evaluation points) of the system with respect to the intended values (e.g., ideal values) of these characteristics; the cost function can also be the maximum of these deviations (e.g., worst deviation). "Evaluation points" may include any characteristics of the system, depending on the context. The design variables of the system can be confined to finite ranges and may be interdependent due to practicalities of implementations of the system. In the case of a lithographic projection apparatus, the constraints are often associated with physical properties and characteristics of the hardware such as tunable ranges, or patterning device manufacturability design rules, and the evaluation points can include physical points on a resist image on a substrate, as well as non-physical characteristics such as dose and focus.

In some examples of a lithographic projection apparatus, a source provides illumination (or other types of radiation) to a patterning device and projection optics direct and shape the illumination, via the patterning device, onto a substrate. For example, projection optics may include at least some of the components 14A, 16Aa, 16Ab and 16Ac. An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer. A resist model can be used to calculate the resist image from the aerial image, an example of which can be found in U.S. Patent Application Publication No. U.S. 2009-0157360, the disclosure of which is hereby incorporated by reference in its entirety. The resist model is related to properties of the resist layer (e.g., only to these properties) (e.g., effects of chemical processes which occur during exposure, PEB and development). Optical properties of the lithographic projection apparatus (e.g., properties of the source, the patterning device and the projection optics) may dictate the aerial image. Since the patterning device used in the lithographic projection apparatus can be changed in some embodiments, it is often desirable to separate the optical properties of the patterning device from the optical properties of the rest of the lithographic projection apparatus including at least the source and the projection optics.

Figure 2:
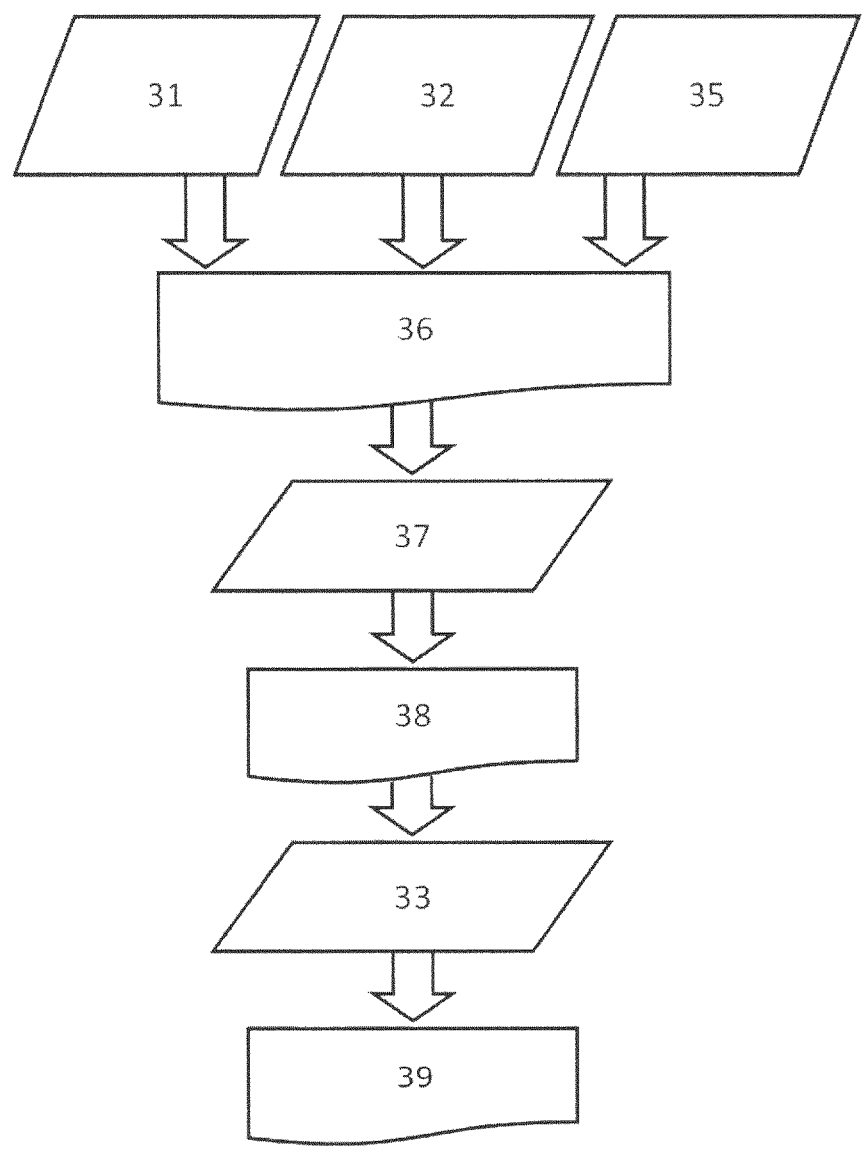
FIG. 2 is a block diagram of a pipeline of simulation models of patterning and etching processes.

An exemplary pipeline for simulating patterning and subsequent subtractive processes is illustrated in FIG. 2. In this example, a source model 31 represents optical characteristics (including radiation intensity distribution, bandwidth and/or phase distribution) of the source. A projection optics model 32 represents optical characteristics (including changes to the radiation intensity distribution and/or the phase distribution caused by the projection optics) of the projection optics. A design layout model 35 represents optical characteristics (including changes to the radiation intensity distribution or the phase distribution caused by a given design layout 33) of a design layout, which is the representation of an arrangement of features on or formed by a patterning device. An aerial image 36 can be simulated from the design layout model 35, the projection optics model 32 and the design layout model 35. A resist image 38 can be simulated from the aerial image 36 using a resist model 37. Simulation of lithography can, for example, predict contours and CDs in the resist image. In some embodiments, the simulation may yield spatial dimensions of simulated patterned structures formed on a simulated substrate by a simulated process, such as line-widths, sidewall taper or curvature, via diameters, fillet radii, chamfer radii, surface roughness, interal stress or strain, overlay, etc.

In some embodiments, the source model 31 may represent the optical characteristics of the source that include, for example, NA settings, sigma (σ) settings as well as any particular illumination shape (e.g. off-axis radiation sources such as annular, quadrupole, dipole, etc.). The projection optics model 32 may represent the optical characteristics of the projection optics, including aberration, distortion, one or more refractive indexes, one or more physical sizes, one or more physical dimensions, etc. The design layout model 35 may represent one or more physical properties of a physical patterning device, as described, for example, in U.S. Pat. No. 7,587,704, which is incorporated by reference in its entirety. The objective of the simulation is to predict, for example, edge placement, aerial image intensity slope or CD, which can then be compared against an intended design. The intended design is generally defined as a pre-OPC (optical proximity corrected) design layout which can be provided in a standardized digital file format such as GDSII or OASIS or other file format.

In some embodiments, the pipeline of FIG. 2 may include an etch model 33 that outputs a post-etch film-stack model 39 (e.g., predicted contours and CDs of an underlying etched layer or layers) based on the result of the resist model 38 (e.g., based on predicted contours and CDs of the patterned resist). In some embodiments, the etch model 33 may account for the type of etch, for example, whether the etch is a dry etch or wet etch, etch chemistries, etch mass-transfer, and plasma properties. The model 33 may also account for properties of the films being etched and those films serving as masking layers for the etch, like film composition, film thickness, and film stress. In some embodiments, parameters of the etch model 33 may include a selectivity of the etch to the various films exposed to the etch, for instance, rates of film etching for the different films. In some embodiments, the etch model 33 may also account for changes in etch rate as aspect ratios increase for features of various sizes. Other parameters of the etch may include directionality (e.g., anisotrophy) of the etch. In some cases, the etch model may account for phenomena like microloading in which etch rates, etch selectivity, or directionality of the etch vary according to the density of local material being etched. In some cases, for example, microloading may cause a relatively isolated trench to etch at a different rate (e.g., faster) relative to an array of relatively closely packed trenches, where etch reactants may tend to slow etching of nearby features. In some cases, the etch model may also account for consumption of masking layers during the etch, for instance, accounting for shift in overlay or feature size as portions of the masking layer or layers are consumed.

In some embodiments, the etch model 33 may account for multiple masking layers and multiple etching steps. For example, in some embodiments, a layer to be etched may be coated with a hardmask, and the hardmask may first be patterned, for instance, by applying a pattern to resist lithographically and then etching the hardmask before etching the underlying layers. Hardmasks can serve a number of purposes. In some cases, etches of the underlying layer may be insufficiently selective between the underlying layer and the resist for the resist pattern to mask the etching of the underlying layer. In these scenarios, a hardmask may first be patterned with resist and a hardmask etch, and then the hardmask may serve as a masking layer for the underlying layer with a different etch chemistry. There are many examples of hardmasks suitable for different underlying layers, one example being silicon nitride serving as a hardmask for an underlying layer of silicon oxide, another example being a tungsten hardmask for an aluminum layer.

It should be noted that, in the art, the terms "hardmask" and "softmask" do not denote some absolute measure of "hardness." Rather, the terms merely serve to distinguish masking layers patterned with a patterning process (a softmask), such as lithography, from masking layers formed by using the softmask to selectively etch an underlying masking layer (a hardmask).

In some embodiments, the pipeline of FIG. 2 may be executed by one or more of the computers described below with reference to FIG. 11. In some embodiments, the pipeline of FIG. 2 may be used to augment a reticle with both optical proximity correction and etch-assist features. In some embodiments, optical proximity correction and etch-assist features may be added to a design layout sequentially, for example, beginning with etch-assist features, which are expected to tend to be larger than optical sub-resolution assist features, and then adding optical proximity correction. Or some embodiments may augment a design layout for patterning a reticle by determining where to add these features concurrently, e.g., by concurrently optimizing both an etch and a patterning process. Examples of a process for adding etch-assist features are described below with reference to FIG. 9, which in some embodiments, may be used concurrently with (or by modifying or interfacing with) simulation software available from Brion Technologies Inc. of 4211 Burton Drive, Santa Clara, Calif. 95054, USA, such as software for process-window optimization or source-mask optimization, like Brion's Tachyon line of products.

As noted, in some embodiments, the etch-assist features may be used to mitigate various undesirable phenomena. Some features reduce variation in pattern-dependent microloading effects, examples of which are described with reference to FIGS. 3 through 5. And some features may reduce resist film-stress caused overlay and CD shifts, examples of which are described with reference to FIGS. 6 through 8. In some embodiments, etch-assist features may be added to mitigate both of these effects, or embodiments may target reduction in these effects in isolation.

Figure 3:
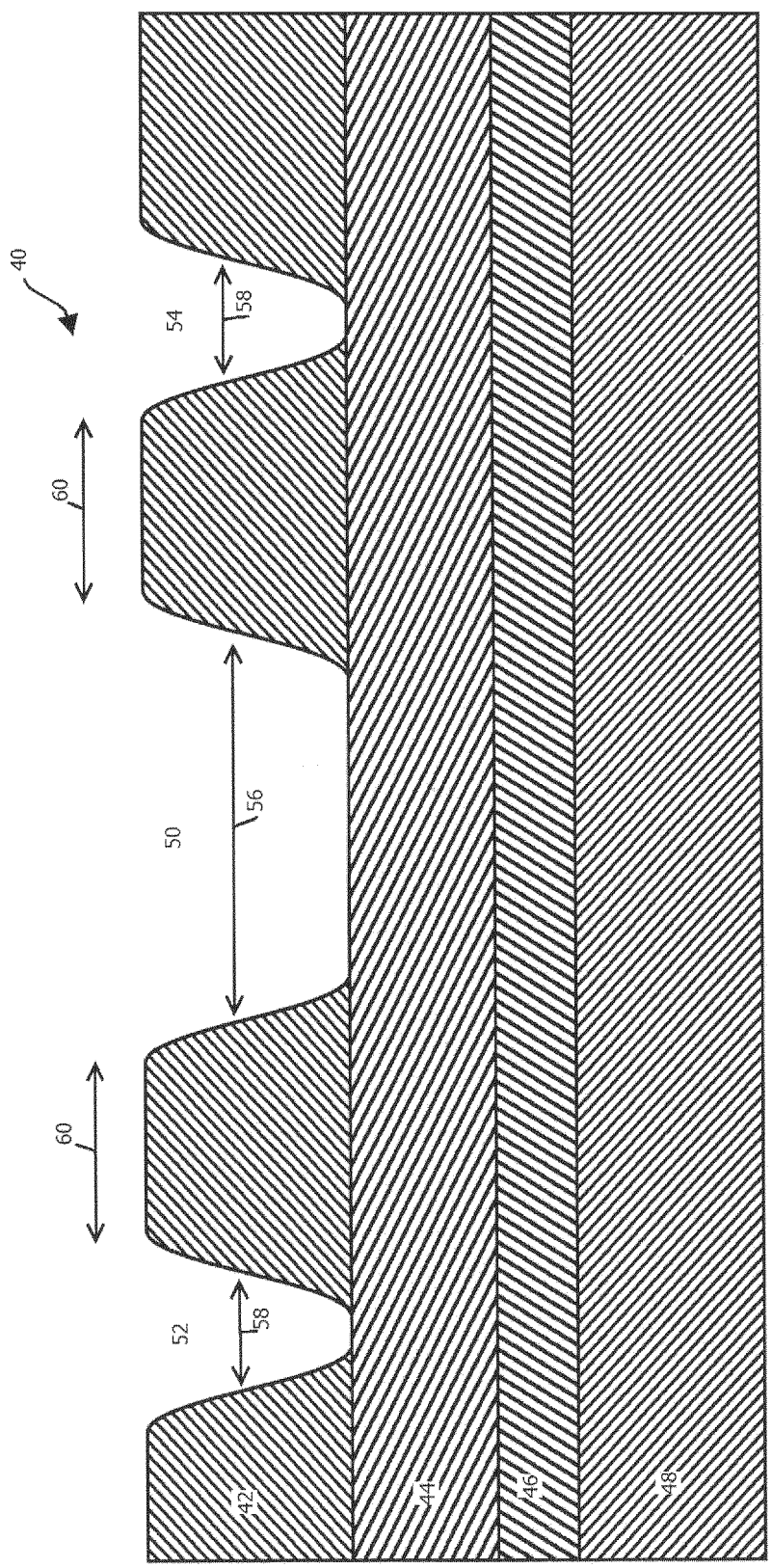
FIG. 3 is a cross-sectional view of a patterned film stack with etch-assist features.

FIG. 3 shows an example of a film stack 40 that exemplifies the use of etch-assist features to mitigate pattern-dependent variations in etch due to microloading variation. In some embodiments, the film stack 40 includes a patterned resist layer 42, a hardmask 44, a layer to be patterned 46, and a substrate 48. These layers, in some embodiments, may include various films, for example, antireflective coatings, stress-relief layers, barrier layers, and the like, and may be applied with various techniques, such as chemical vapor deposition, epitaxial deposition, spinning deposition, or physical vapor deposition. In some embodiments, the substrate 48 includes various underlying structures previously patterned, for example, on a silicon wafer. In some embodiments, the patterned resist layer 42 may be patterned by first aligning a lithography apparatus to those underlying layers.

In this example, the patterned resist layer 42 includes a trench 50 to be transferred to the layer 46 as well as etch-assist features 52 and 54, each patterned in the resist (e.g., positive or negative photoresist) layer 42. FIG. 3 illustrates a side sectional view of the film stack 40, and in some embodiments, the trench 50 and the etch-assist features 52 and 54 may extend some distance normal to the plane of the figure, such as more than 10 times a width 56 of the trench 50.

In some embodiments, the trench 50 may be relatively isolated as compared to other trenches elsewhere in a pattern in the resist 42. Consequently, in some cases, absent etch-assist features 52 and 54, the trench 50 may etch at a faster rate than those other trenches. It is believed that the trench 50, during etching, may experience less microloading from fewer etch reaction byproducts being produced proximate the trench 50. This, absent the etch-assist features 52 and 54, may cause the etching of trench 50 to over etch, e.g., consuming undesirable amounts of the underlying layer 46 (which may translate into consumption of the substrate 48 in later etches). At the same time, a certain etch duration may be needed to complete other, more densely-packed features subject to more intense microloading. Etch-assist features 52 and 54 may mitigate this effect by causing the etch to consume additional portions of the hardmask 44. This is expected to cause microloading near feature 50, thereby mitigating differences in microloading effects during patterning of the hardmask 44 across a pattern.

Positioning and sizing of the features 52 and 54 relative to feature 50 may be selected based on parameters of the patterning and etching processes. In some cases, the etch-assist features 52 and 54 may be a distance 60 away from the trench 50, or other main feature, selected such that byproducts from the etching of the assist features 52 and 54 affect the etching of the main feature 50 through at least some microloading. In some cases, the distances 60 may be larger than a resolution limit of the patterning process of the resist 42, such that the etch-assist features 52 and 54 can be patterned in the resist 42. In some cases, optical proximity correction sub-resolution assist features may be added to a reticle to enhance (e.g., sharpen or better define) the etch-assist features 52 and 54 or the main feature 50. In some cases, features 52 and 54 may be sized and positioned to also provide optical proximity correction benefits for the main feature 50. Similarly, the etch-assist features 52 and 54 may have a width 58 that is larger than a resolution limit of the patterning process used to pattern the resist 42, such that these features 52 and 54 are formed in the resist 42.

In some cases, the main feature 50 may have a width 56 that is substantially larger than the width 58. The widths 56 and 58 may be selected such that in subsequent etch steps, feature 50 is transferred to both the hardmask 44 and the layer to be patterned 46, while the features 52 and 54 washout in the etch of the hardmask 44.

Figure 4:
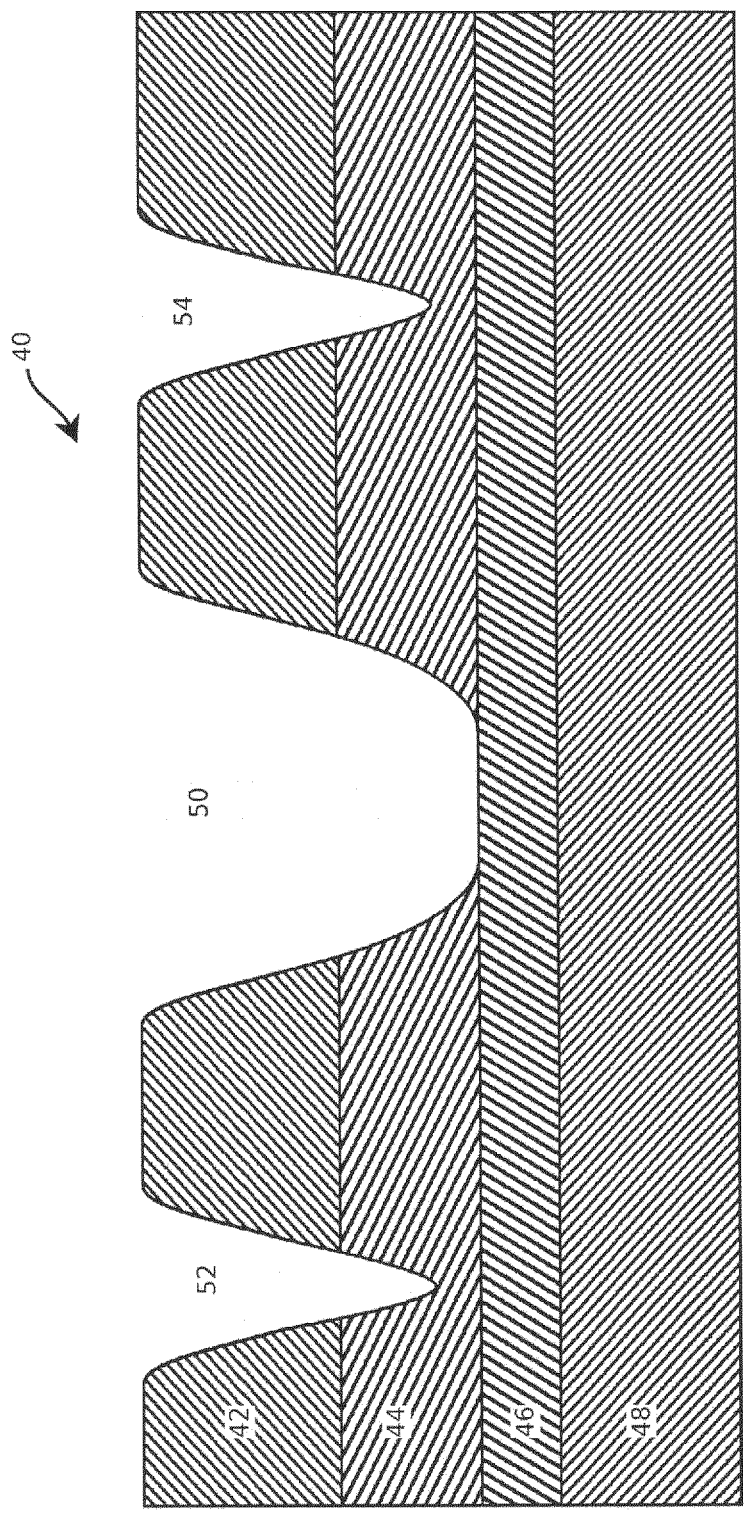
FIG. 4 is a cross-sectional view of the patterned film stack of FIG. 3 after etching a hardmask.

The phenomenon of a feature washing out during an etch is illustrated by way of example with FIG. 4. FIG. 4 shows the film stack 40 of FIG. 3 after an etch has been used to transfer the pattern from the resist layer 42 to the hardmask 44. As illustrated, the feature 50 fully penetrated the hardmask 44, exposing the layer to be patterned 46 to subsequent etch steps. But the etch-assist features 52 and 54 do not penetrate the hardmask 44. This difference in etch rate may be a function of the relatively narrow width 58 (as shown in FIG. 3) of features 52 and 54. In some cases, the rate at which a film etches may decrease as the aspect ratio of a feature being etched increases during an etch. Narrow features reach higher aspect ratios more quickly during an etch than wider features. Consequently, the relatively narrow etch-assist features 52 and 54 may etch more slowly through the hardmask 44 relative to the relatively wide main feature 50. At the same time, features 52 and 54 cause some consumption of the hardmask 44, thereby contributing to microloading of the environment around the main feature 50, causing the etching of main feature 50 to be more similar to the etching of more densely packed features elsewhere in the pattern.

Features 52 and 54 are said to be sub-etch resolution features, meaning in this context that they are present in the resist pattern, but fail to transfer (e.g., to fully transfer) to the layer to be patterned 46. In this example, the features 52 and 54 have at least one lateral dimension 58 that imbues the features with this property for the particular etch process in this example. The magnitude of dimension that gives rise to this property depends on several factors, including the thickness of the hardmask layer 44, the directionality of the etch, and the degree to which the aspect ratio of a feature affects the etch rate. In some cases, the etch resolution limit may be determined empirically. For instance, the film stack 40 may be patterned with a test pattern having an array of trenches of progressively decreasing width. A test etch of the hardmask 44 with this test pattern may reveal which trench widths failed to penetrate the hardmask 44, thereby indicating the resolution limit of the etch process. In some cases, sub-etch resolution features may be etch assist features, e.g., features shaped or sized to impart beneficial effects in a post-etch structure.

In some embodiments, the resist layer 42 may be removed in a subsequent process, for example, by exposure to oxygen at a relatively high temperature that tends to consume polymer based resist, or in some cases, the resist 42 may be left in place, and the resist 42 may be consumed during the etching of the subsequent layers.

Figure 5:
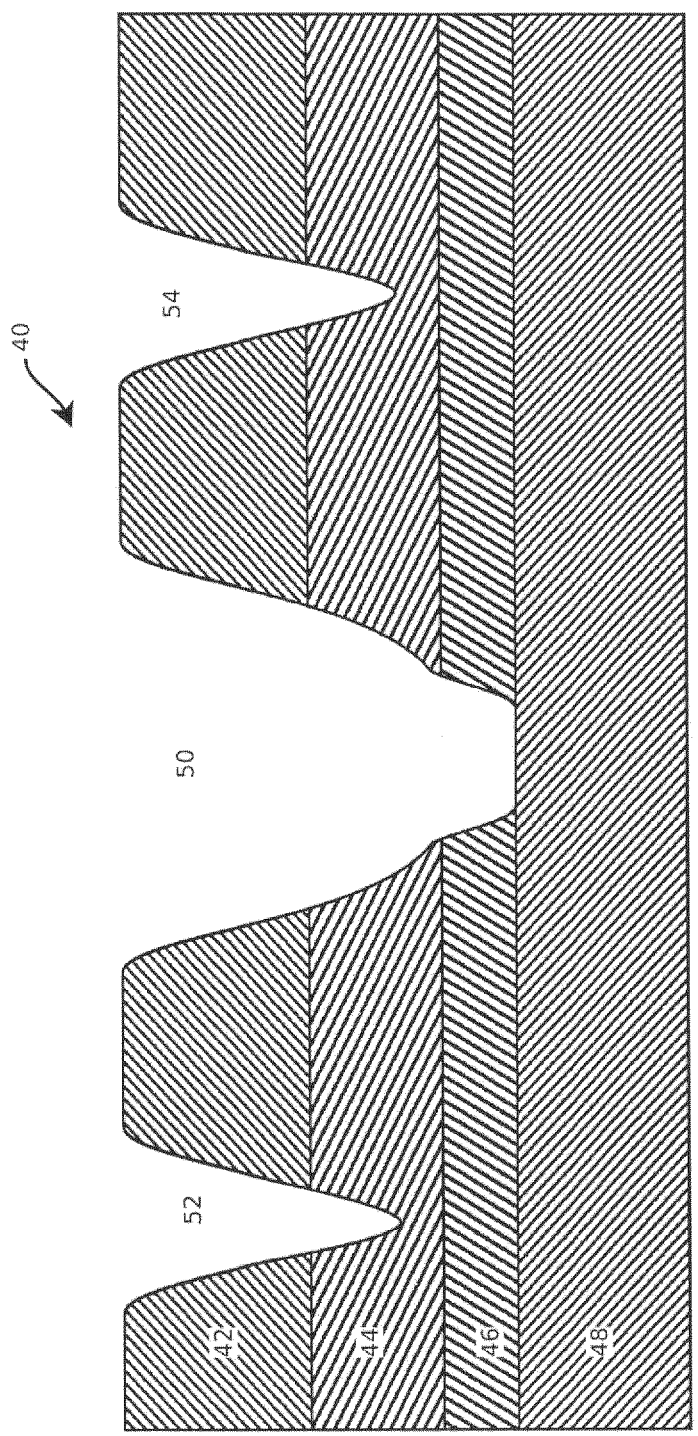
FIG. 5 is a cross-sectional view of the patterned film stack of FIG. 4 after etching a layer to be patterned under the hardmask.

FIG. 5 shows the film stack 40 described above after etching of the layer 46 to be patterned. As illustrated, the hardmask 44 prevents the etch-assist features 52 and 54 from transferring to the layer 46, while the main feature 50 transferred to the layer 46, resulting in a trench, in this case, in the layer 46. It is expected that, because the etching of the hardmask 44 for feature 50 was microloaded by the etch-assist features 52 and 54, the ultimate dimensions of the feature 50 in the layer 46 are relatively similar to dimensions of similar features elsewhere in the pattern that are more densely packed and subject to micro loading without etch-assist features.

In some cases, in subsequent processing, the layers 42 or 44 may be removed, leaving the layer 46 in place with the feature 50 but little or no direct indication of the etch-assist features 52 and 54 in the layer 46 to be patterned. In other embodiments, the etch-assist features 52 and 54 may transfer to the underlying layer 46 to a lesser degree than the feature 50, for example, as the hardmask 44 is consumed during etching at a slower rate than the underlying layer 46, and the hardmask 44 is ultimately breached due to earlier thinning from the assist features 52 and 54. In these examples, though, features 52 and 54 are expected to not penetrate layer 46.

It should be noted that, in some cases, anomalous effects may occur near edges of substrates, in which case, for example, features 52 and 54 may fully penetrate layer 46, and in some cases, even layer 48. These anomalous edge conditions, particularly in regions not expected to yield functioning devices, should not be considered when ascertaining whether features 52 and 54 penetrate layer 44 or transfer to layer 46.

The above example was described with reference to a trench, but other embodiments may use etch-assist features to benefit other pattern elements. For example, a relatively isolated via may be surrounded by a substantially concentric, circular etch-assist feature. Or smaller, surrounding or proximate etch-assist vias may be added, such as vias that are large enough in diameter to be patterned in the resist 42 without transferring to the layer to be patterned 46 during subsequent etch steps. Similarly, etch-assist features 52 and 54 were described as adjacent trenches to the feature 50, but microloading may also be accomplished with other shapes, for example, an array of adjacent vias interspersed alongside trench 50. Further, in the illustrated example, a single etch-assist feature 52 and 54 is shown on either side of the main feature 50, but some embodiments may include additional etch-assist features to add additional micro loading. For example, some embodiments may include more etch-assist features in spaced relation to the main feature 50 and the other etch-assist features 52 and 54 on either side of the main feature 50. These other etch-assist features may have similar dimensions 60 and 58 as shown in FIG. 3 relative to the etch-assist features 52 and 54, except spaced away from the etch-assist features 52 and 54 opposite the main feature 50.

Figure 6:
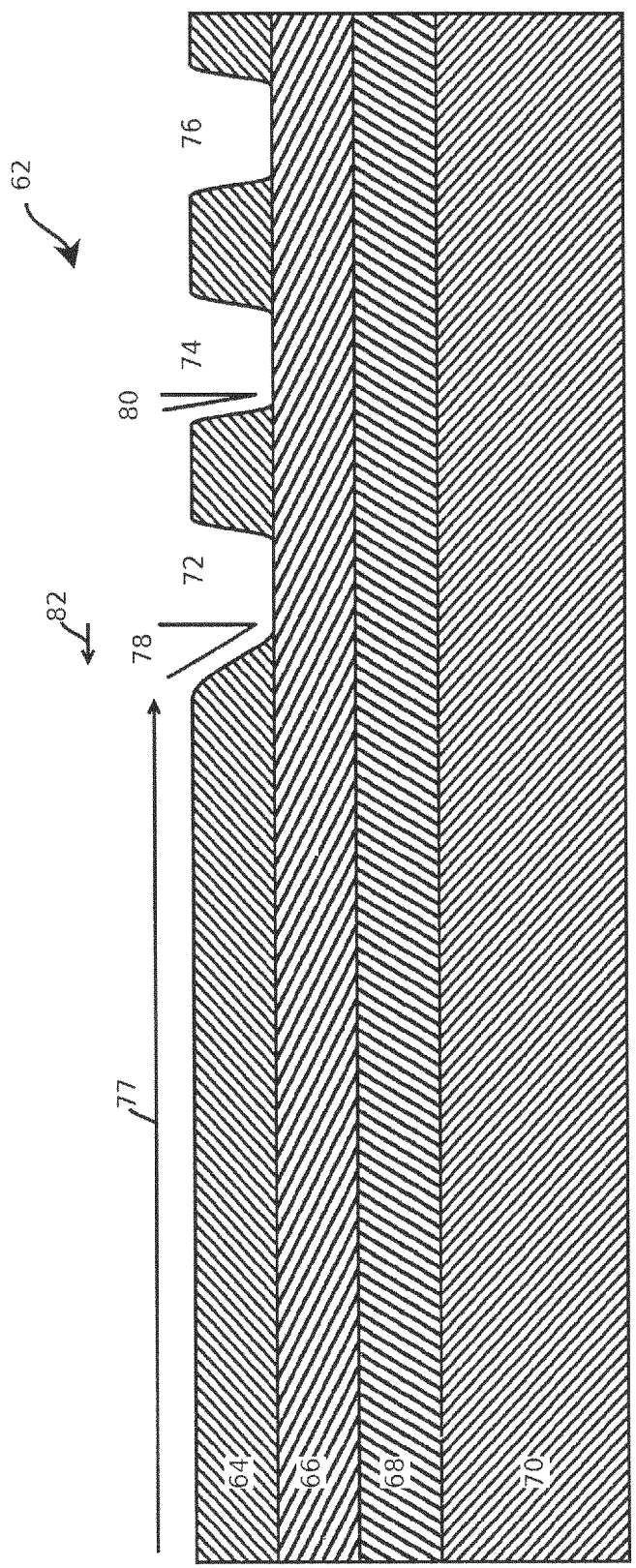
FIG. 6 is a cross-sectional view of a patterned film stack illustrating sidewall distortion.

FIG. 6 shows another film stack 62 that illustrates another phenomenon that may be mitigated with etch-assist features. In this example, film stack 62 includes a layer of patterned resist 64, a hardmask layer 66, a layer to be patterned 68, and a substrate 70. These layers may, for example, be of the same materials as the examples described above. In the illustrated patterned resist layer 64, three trenches 72, 74, and 76 are shown. As illustrated, the right side of trench 72 is relatively densely packed with other features 74 and 76, while the left side of trench 72 includes a relatively long span 77 of continuous resist 64. In some cases, this arrangement is expected to be relatively common with negative tone resist.

As illustrated, the sidewall of trench 72 has an angle 78 that is relatively shallow compared to the angle 80 of the sidewall of trench 74. This difference in angles 78 and 80 is believed to be caused by accumulated film stress in the resist layer 64 over the relatively long span 77, for example, due to differing rates of expansion or contraction of the films 64 and 66. This effect is expected to tend to pull the sidewall of trench 72 into a relatively shallow angle 78. During subsequent etch steps, this relatively shallow angle 78 may cause trench 72 to have an overlay shift to the left, as the relatively thin, lower portions of the sidewall are consumed, and underlying layers of the hardmask 66 and layer to be patterned 68 are consumed with a leftward shift 82. A CD of the feature 72 may also be wider than desired. This bias or shift to the left for trench 72 may cause the pattern in layer 68 to deviate from the pattern in a design layout, and may cause yield problems in resulting products or impose undesirable design constraints. Similar issues are expected to arise with compressive film stresses in the patterned resist layer 64.

Figure 7:
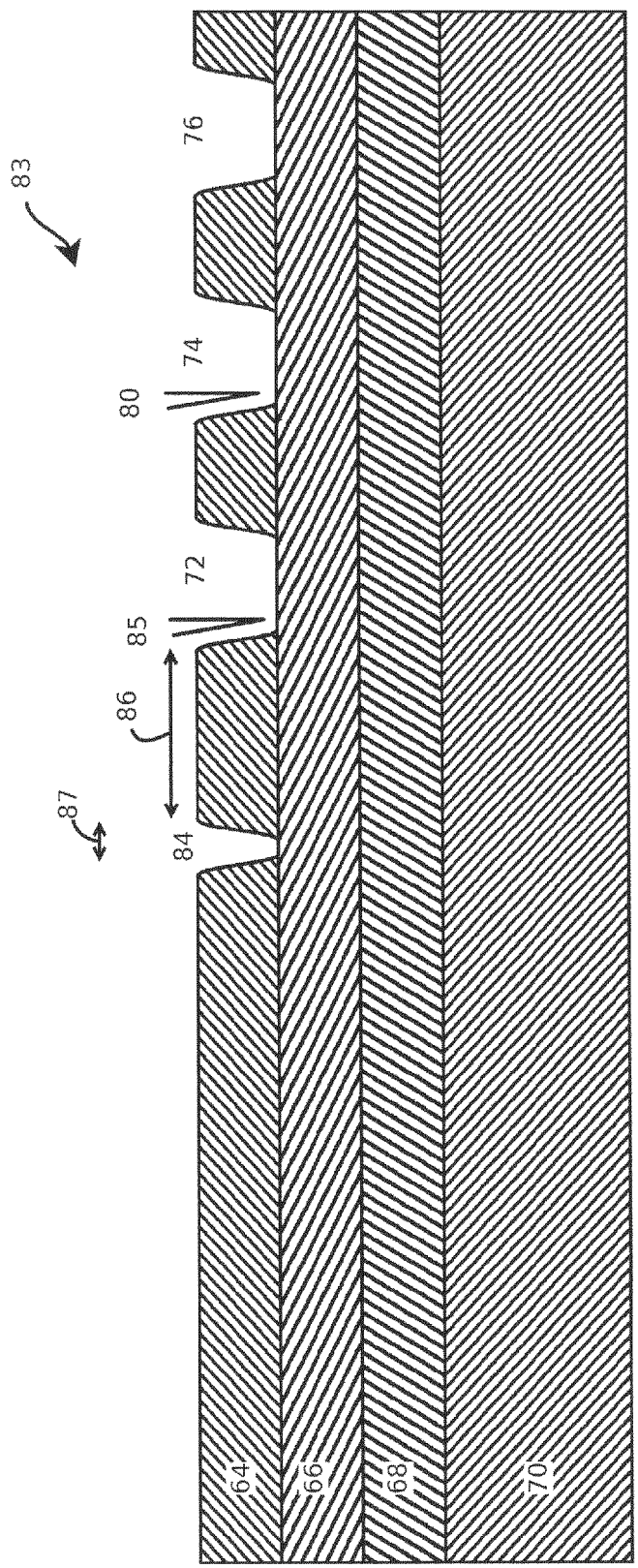
FIG. 7 is a cross-sectional view of a patterned film stack with etch-assist features configured to mitigate sidewall distortion.
Figure 8:
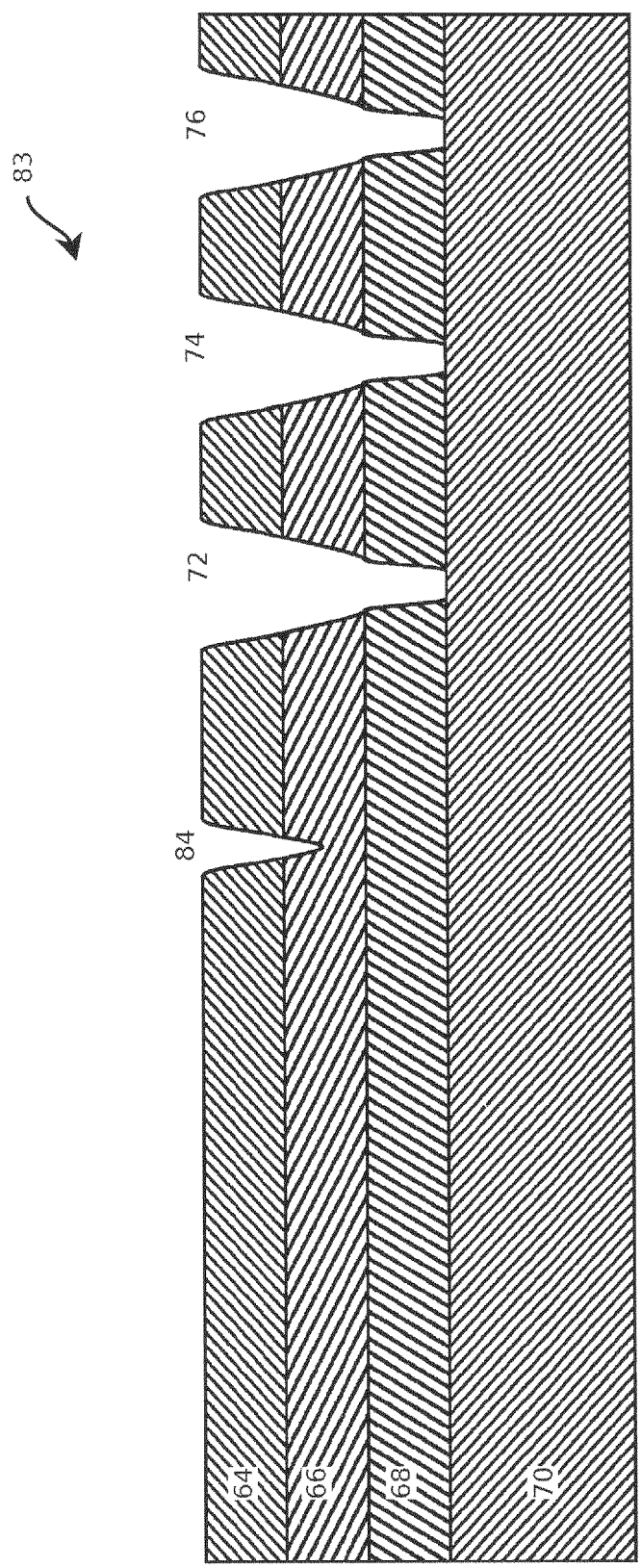
FIG. 8 is a cross-sectional view of the patterned film stack of FIG. 7 after etching a layer to be patterned under the hardmask.

FIGS. 7 and 8 illustrate examples of techniques by which etch-assist features may mitigate the bias of FIG. 6. In this example a film stack 83 is shown having the same layers 64, 66, 68, and 70 described above, except that an etch-assist feature 84 has been added in the pattern of the resist layer 64 to the left of the trench 72. This etch-assist feature 84 is believed to provide film stress relief in the layer 64 and is expected to reduce differences between angle 85 of trench 72 and angle 80 of the adjacent trench 74. In some cases, a width 87 of the etch-assist feature 84 may be selected such that the etch-assist feature 84 is larger than a resolution limit of the patterning process. An etch-assist feature 84 may be spaced a distance 86 away from the trench or main feature 72 that is larger than a resolution limit of the patterning process used to pattern the resist layer 64. In some cases, the sharpness of dimensions 86 and 87 may be enhanced with optical sub-resolution assist features added during optical proximity correction of a design layout for patterning a reticle. These sub-resolution assist features may not transfer directly to the resist 64, much but may enhance the sharpness of the etch-assist feature. In some cases, etch-assist feature 84 may be positioned and sized to also provide optical proximity correction for trench 72. In some cases, the width 87 of the etch-assist feature 84 may be narrow enough that feature 84 washes out during subsequent etch steps in which features 72, 74, and 76 are transferred to the hardmask 66, and then to the layer to be patterned 68. Thus, feature 84 may be a sub-etch resolution feature.

A post-etch version of film stack 83 is shown, by way of example, in FIG. 8. As illustrated, etch-assist feature 84 washed out during etching of the hardmask 66. Then, during a subsequent etch of the layer to be patterned 68, features 72, 74, and 76 transferred to layer 68, while the etch-assist feature 84 did not transfer, as hardmask layer 66 remained intact under etch-assist feature 84. As with the previous processes, in some embodiments, layers 64 and 66 may be removed in subsequent steps, leaving features 72, 74, and 76 present in the film stack 83, while removing feature 84.

An indirect effect, though, of etch-assist feature 84, in this example, remains in feature 72. As illustrated, the leftward edge of feature 72 is not shifted to the left due to a shallow sidewall angle of the resist layer 64, as resist film stress is relieved by the etch-assist feature 84. In some cases, multiple etch-assist features 84 may be placed along the span 77, for example at regular intervals, to mitigate the buildup of film stress over relatively long expanses of resist 64.

The illustrated example is described with reference trenches, for example, with etch-assist feature 84 extending parallel to features 72, 74, and 76 normal to the plane of FIGS. 7 and 8, for instance, extending more than 10 times the width of one of the features 72, 74, or 76. But in other examples, similar techniques may be used for other features. For example, a relatively isolated via may have resist sidewalls pulled radially outward by film stress, and a substantially circumferential circular etch-assist feature surrounding the via may relieve these film stresses.

Figure 9:
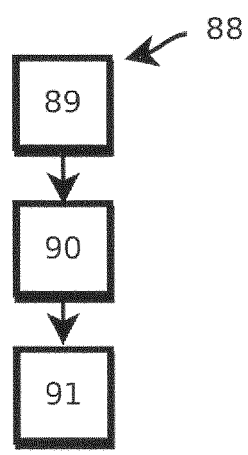
FIG. 9 is flow chart of a process for adding etch-assist features to a design layout.

FIG. 9 shows an example of a process 88 configured to augment a design layout with etch-assist features to mitigate one or more of the effects described above. In some cases, the process of FIG. 9 may be performed with one or more of the computers of FIG. 11 having in memory the model of FIG. 2 and executing a mask optimization routine. In some embodiments, the process 88 includes obtaining a layout specifying a pattern to be transferred to a substrate via a patterning process and an etch process, as indicated by block 89. In some embodiments, the layout may be a digital design file, for example, prepared with electronic design automation software, specifying a desired pattern layer for an integrated circuit or other device.

Next, some embodiments may modify the layout to include an etch-assist feature that is larger than a resolution limit of the patterning process and smaller than a resolution limit of the etch process, as indicated by block 90. In some embodiments, the etch-assist feature is configured to reduce a bias of the patterning process or the etch process, or to reduce an etch induced shift of a feature in the layout due to (e.g., revealed by) the etch process.

In some cases, the step 90 may include adding etch-assist features to a pattern adjacent features expected to otherwise experience the above-described phenomena. For example, some embodiments may use a rule-based approach to add etch-assist features, e.g., adding an etch-assist feature in response to determining a pattern feature does not have another feature within a threshold distance. Or some embodiments may model microloading from a given pattern and then select features experiencing less than a threshold amount of microloading for augmentation. In some embodiments, microloading may be approximated, for example, by applying a Gaussian noise filter to a pattern. Embodiments may overlay the result of the Gaussian noise filter on the original pattern and, then, determine which features are overlaid by less than a threshold amount of the Gaussian noise, e.g., by integrating the noise over the area of the feature. In some embodiments, etch-assist features may be added and the process remodeled with an iterative process, until all, or more than a threshold amount, of the features are expected to experience similar, e.g., more than a threshold amount, of microloading.

In some embodiments, film stress in a patterned resist layer may also be modeled, and etch-assist features may be added to mitigate the film stress. For example, in some cases, etch-assist features may be added normal to a direction of film stress (e.g., following film stress iso-curves determined with a finite-element model of the patterened resist) where the film stress exceeds a threshold amount of stress. In some cases, the film stress modeling may be repeated to identify areas in which film stress still exceeds the threshold amount, and additional features may be added iteratively until sufficient film stress is released. In another example, etch-assist features may be added with a rule-based approach, for example, by identifying each trench or via having more than a threshold distance of uninterrupted resist surrounding or on one side of the trench or via, and adding an etch-assist feature alongside or around the trench or via.

In some embodiments, etch-assist features may be added both to reduce microloading variation and to reduce film-stress-induced resist sidewall distortion, or in some cases, only one of these techniques may be used. Similarly, in some cases, optical sub-resolution assist features may be added to a reticle layout after the etch-assist features are determined, as etch-assist features may affect the appropriate positioning and application of optical proximity correction. Or in some cases, the position of etch-assist features may be adjusted to contribute to optical proximity correction of supra-etch resolution features.

Next, some embodiments may store the modified layout in memory, as indicated by block 91. In some embodiments, the modified layout may be written to a reticle, which may then be used in production, for instance, with the process of FIG. 10, to form various electronic, optical, or mechanical devices.

Figure 10:
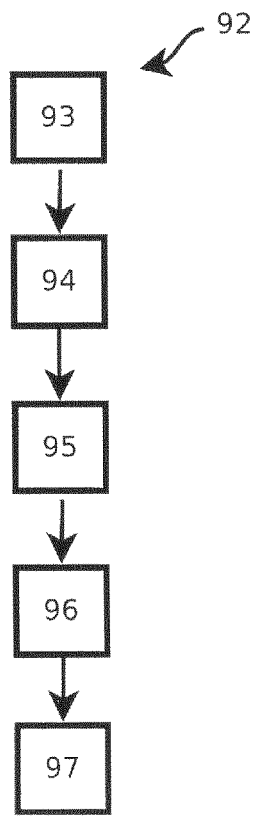
FIG. 10 is flow chart of a process for patterning a layer with a reticle designed with the process of FIG. 9.

FIG. 10 illustrates an example of a process 92 for patterning and etching layers with the benefit of etch-assist features. In some embodiments, the process 92 begins with obtaining a reticle that includes an etch-assist feature, as indicated by block 93. The feature may be larger than a resolution limit of the patterning process, smaller than a resolution limit of the etch process, and may reduce a bias or overlay error of the patterning process or the etch process. In some embodiments, the reticle may be obtained by performing the process of FIG. 9, or another entity may perform the process of FIG. 9 and provide the reticle or a design for the reticle.

Next, in some embodiments, the process 92 includes applying a hardmask layer to a layer of a substrate to be patterned, as indicated by block 94, and patterning a softmask on the hardmask layer as indicated by block 95. The appropriate material for hardmask layer is expected to depend on the desired selectivity of the etch to the underlying layer to be patterned. Examples are listed above. The softmask may be patterned by applying a layer of resist and using one of the lithographic apparatuses is described herein to pattern the resist layer.

Next, some embodiments may etch the hardmask layer, as indicated by block 96. In some cases, etching the hardmask layer may include etching a portion of the hardmask layer underlying the etch-assist feature and etching entirely through the hardmask layer in the area underlying a feature to be transferred to the underlying layer. In some cases, etching under the etch-assist feature may include etching at a progressively slower rate as an aspect ratio of the etch-assist feature increases. In some embodiments, the slowing of the rate may be such that the etch-assist feature does not penetrate the hardmask during the etch process.

Next, some embodiments may etch the underlying layer of the substrate to be patterned, as indicated by block 97. In some embodiments, this step may include etching the non-etch-assist features of the pattern into the underlying layer without etching the etch-assist features into the underlying layer. In some embodiments, the softmask, the hardmask, or both may be removed, thereby removing the etch-assist feature from the substrate while leaving the underlying feature in the layer to be patterned.

In some embodiments, the process 92 may be repeated through multiple layers forming a given device. Resulting devices may, in some cases, be encapsulated, singulated, mounted to printed circuit boards, and installed, e.g., in electronic devices.

In some cases, etch-induced effects may be harnessed for purposes other than making the post-etch structures more closely match a design layout. Etch assist features, in some embodiments, may also be sized and positioned to expand the process window of downstream processes, following a subsequent etch. For instance, such features may be used to expand the process window for subsequent patterning steps. As explained above, etch assist features may affect the critical dimensions and overlay positioning of structures formed after etching a hardmask. These effects may be modeled in an etch model. And the model may be used to optimize (or otherwise improve) the sizing and positioning of etch assist features based on their effect on the process window of a downstream patterning process. For instance, etch assist features may be configured by iteratively modeling the effect of candidate etch assist features, calculating an aggregate measure of fitness or error for the features relative to a the process window of a downstream patterning process, and adjusting the candidate etch assist features (for instance, in a direction indicated by a gradient descent algorithm), until the difference between consecutive iterations is less than a threshold amount indicating likely proximity to a local or global minimum or maximum. In other cases, the target may be a process window of a patterning process with relatively challenging features to pattern in alignment with features in the earlier layer. To model the cumulative effect of multiple patterning processes, some embodiments may include a model that accounts for the downstream patterning process and is suitable for predicting CD and positioning errors, such that etch assist features may be sized and positioned to reduce these errors. Or in some embodiments, such etch-assist features may be positioned with a rule-based approach, e.g., on either side of a line except where a via is expected to land for a negative tone resist, thereby pulling the sidewalls into shallower angles near the points of contact and potentially expanding the area of contact after etch without giving rise to excessive parasitic capacitance between adjacent lines.

As described, some embodiments may mitigate pattern dependent process variation by selectively applying etch-assist features that mitigate the variation while washing out of the etching process and not transferring to the functioning device. Various portions of the above-described techniques may be implemented with the following examples of computer systems and lithographic apparatuses.

Figure 11:
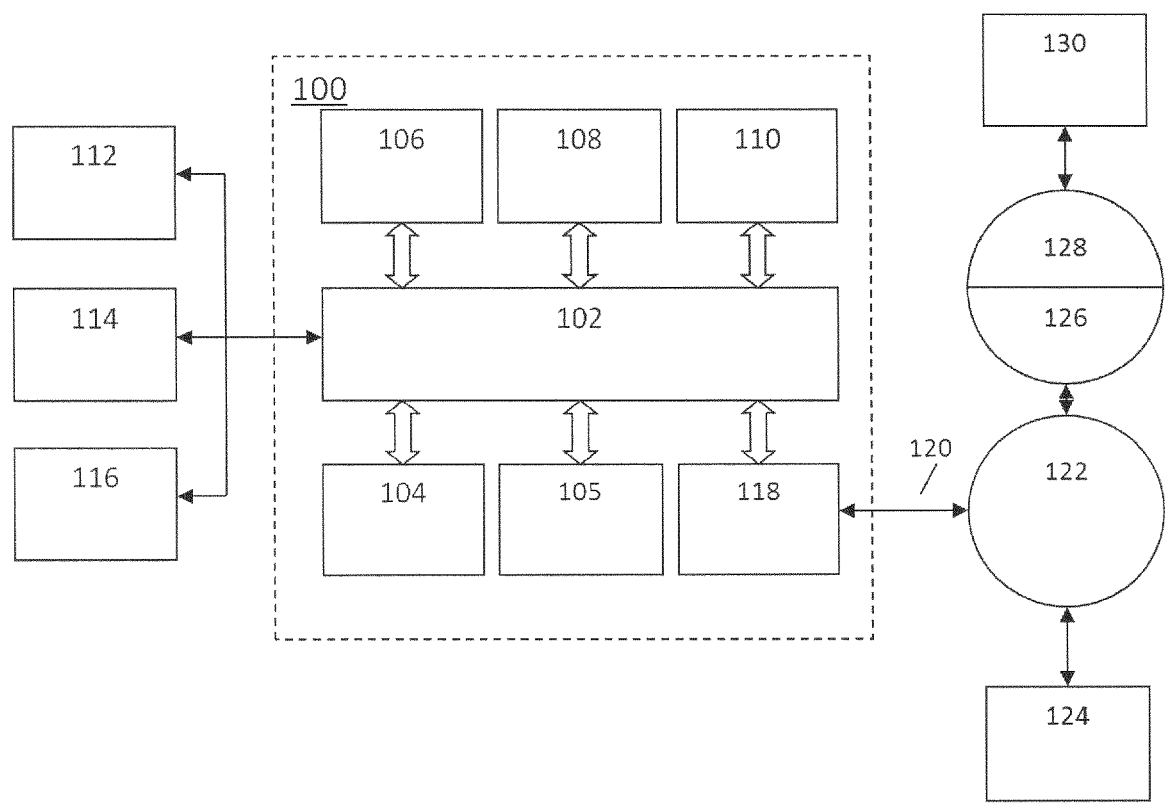
FIG. 11 is a block diagram of an example computer system.

FIG. 11 is a block diagram that illustrates a computer system 100 that may assist in implementing the simulation, characterization, and qualification methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of the optimization process may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. The computer need not be co-located with the patterning system to which an optimization process pertains. In some embodiments, the computer (or computers) may be geographically remote.

The term "computer-readable medium" as used herein refers to any tangible, non-transitory medium that participates in providing instructions to processor 104 for execution. Such a medium may take many forms, including non-volatile media and volatile media. Non-volatile media include, for example, optical or magnetic disks or solid state drives, such as storage device 110. Volatile media include dynamic memory, such as main memory 106. Transmission media include coaxial cables, copper wire and fiber optics, including the wires or traces that constitute part of the bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge. In some embodiments, transitory media may encode the instructions, such as in a carrier wave.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for the illumination optimization of the embodiment, for example. The received code may be executed by processor 104 as it is received, and/or stored in storage device 110, or other non-volatile storage for later execution. In this manner, computer system 100 may obtain application code in the form of a carrier wave.

Figure 12:
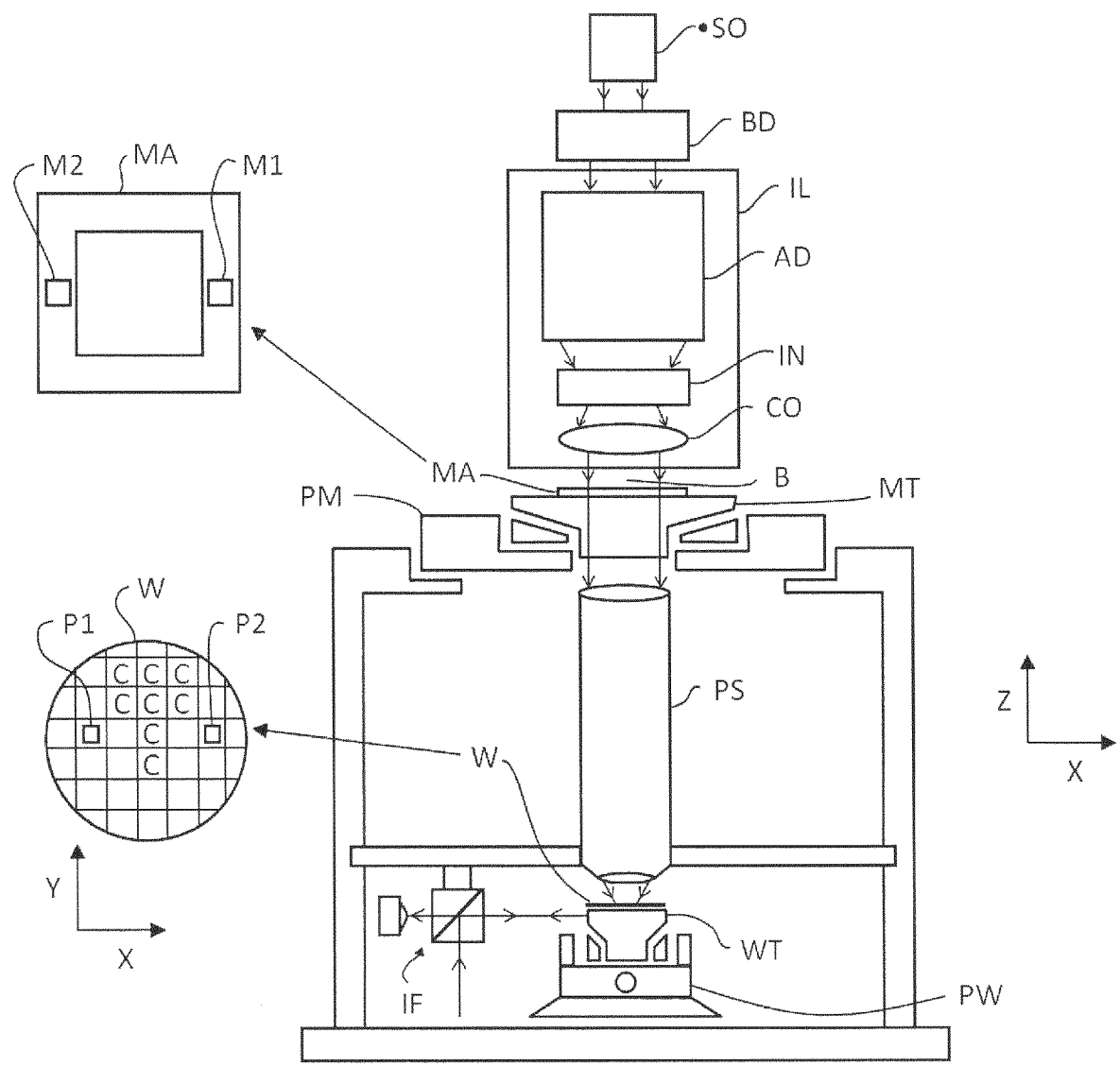
FIG. 12 is a schematic diagram of another lithography system.

FIG. 12 schematically depicts an exemplary lithographic projection apparatus whose process window for a given process may be characterized with the techniques described herein. The apparatus comprises:

an illumination system IL, to condition a beam B of radiation. In this particular case, the llumination system also comprises a radiation source SO;

a first object table (e.g., patterning device table) MT provided with a patterning device holder to hold a patterning device MA (e.g., a reticle), and connected to a first positioner to accurately position the patterning device with respect to item PS;

a second object table (substrate table) WT provided with a substrate holder to hold a substrate W (e.g., a resist coated silicon wafer), and connected to a second positioner to accurately position the substrate with respect to item PS;

a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as -outer and -inner, respectively) of the intensity distribution in the beam. In addition, it will generally comprise various other components, such as an integrator IN and a condenser CO. In this way, the beam B impinging on the patterning device MA has a desired uniformity and intensity distribution in its cross section.

It should be noted with regard to FIG. 12 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or F2 lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 12. However, in the case of a stepper (as opposed to a step-and-scan tool) the patterning device table MT may just be connected to a short stroke actuator, or may be fixed.

The depicted tool can be used in two different modes:
In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;
In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 13:
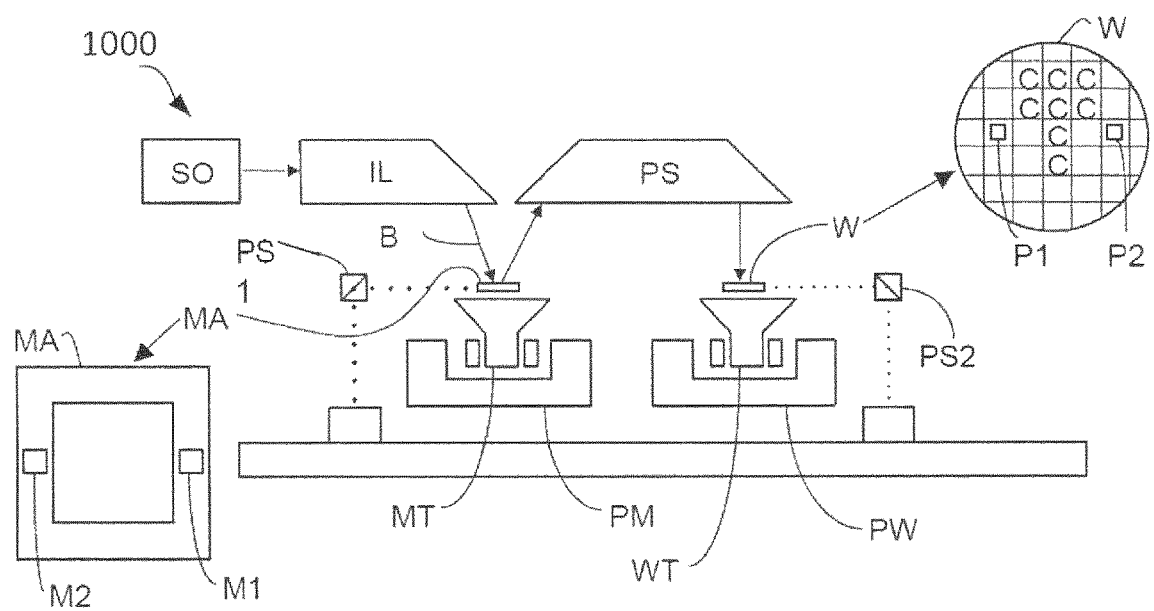
FIG. 13 is a schematic diagram of another lithography system.

FIG. 13 schematically depicts another exemplary lithographic projection apparatus 1000 whose process window for a given process may be characterized with the techniques described herein.

The lithographic projection apparatus 1000, in some embodiments, includes:
a source collector module SO
an illumination system (illuminator) IL configured to condition a radiation beam B (e.g. EUV radiation).
a support structure (e.g. a patterning device table) MT constructed to support a patterning device (e.g. a mask or a reticle) MA and connected to a first positioner PM configured to accurately position the patterning device;
a substrate table (e.g. a wafer table) WT constructed to hold a substrate (e.g. a resist coated wafer) W and connected to a second positioner PW configured to accurately position the substrate; and
a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

As shown in FIG. 13, in some embodiments, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 13, for providing the laser beam exciting the fuel. The resulting plasma emits output radiation, e.g., EUV radiation, which is collected using a radiation collector, disposed in the source collector module. The laser and the source collector module may be separate entities, for example, when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors or a beam expander. In other cases the source may be an integral part of the source collector module, for example when the source is a discharge produced plasma EUV generator, often termed as a DPP source.

The illuminator IL may include an adjuster for adjusting the angular intensity distribution of the radiation beam. Generally, at least the outer or inner radial extent (commonly referred to as σ-outer and σ-inner, respectively) of the intensity distribution in a pupil plane of the illuminator can be adjusted, in some embodiments. In addition, the illuminator IL may include various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device, in this example. After being reflected from the patterning device (e.g., mask) MA, the radiation beam B passes through the projection system PS, which focuses the beam onto a target portion C of the substrate W. With the aid of the second positioner PW and position sensor PS2 (e.g., an interferometer, linear encoder or capacitive sensor), the substrate table WT can be moved accurately, e.g., so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 may be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that uses programmable patterning device, such as a programmable mirror array of a type as referred to above.

Figure 14:
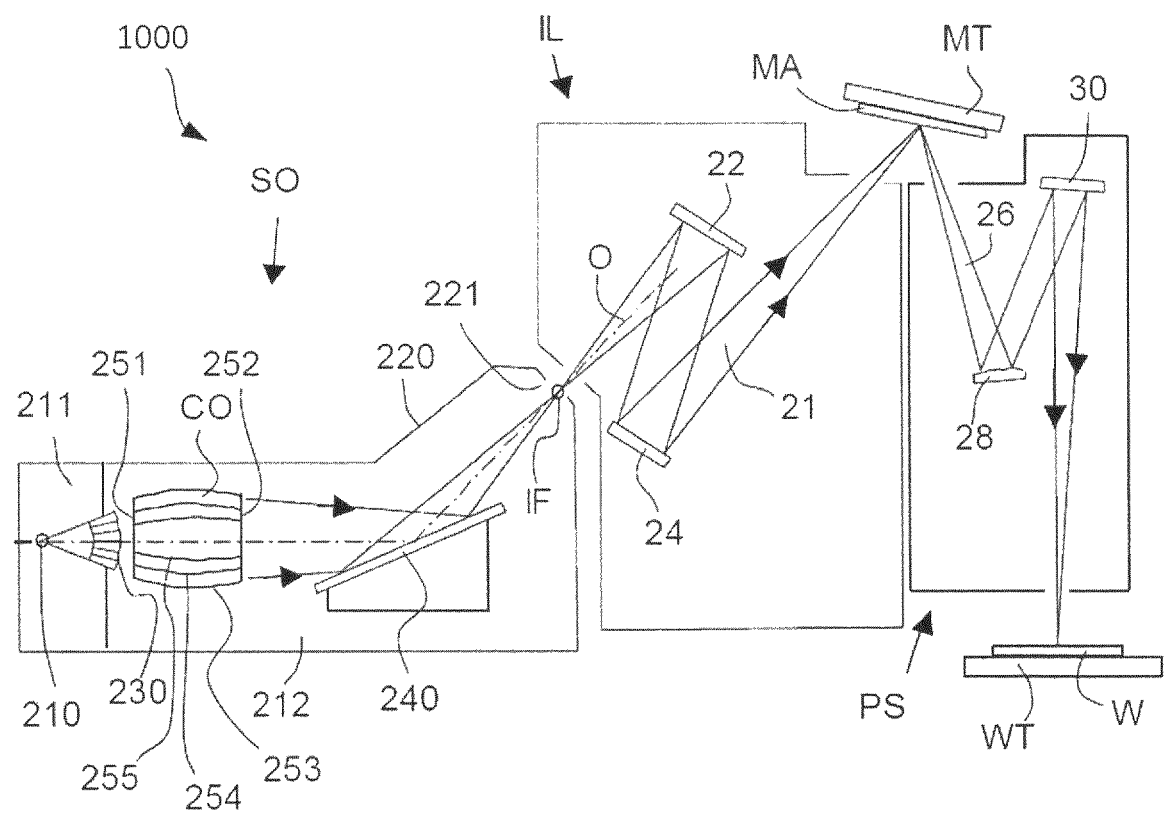
FIG. 14 is a more detailed view of the system in FIG. 13.

FIG. 14 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing an at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 14.

Collector optic CO, as illustrated in FIG. 14, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 15:
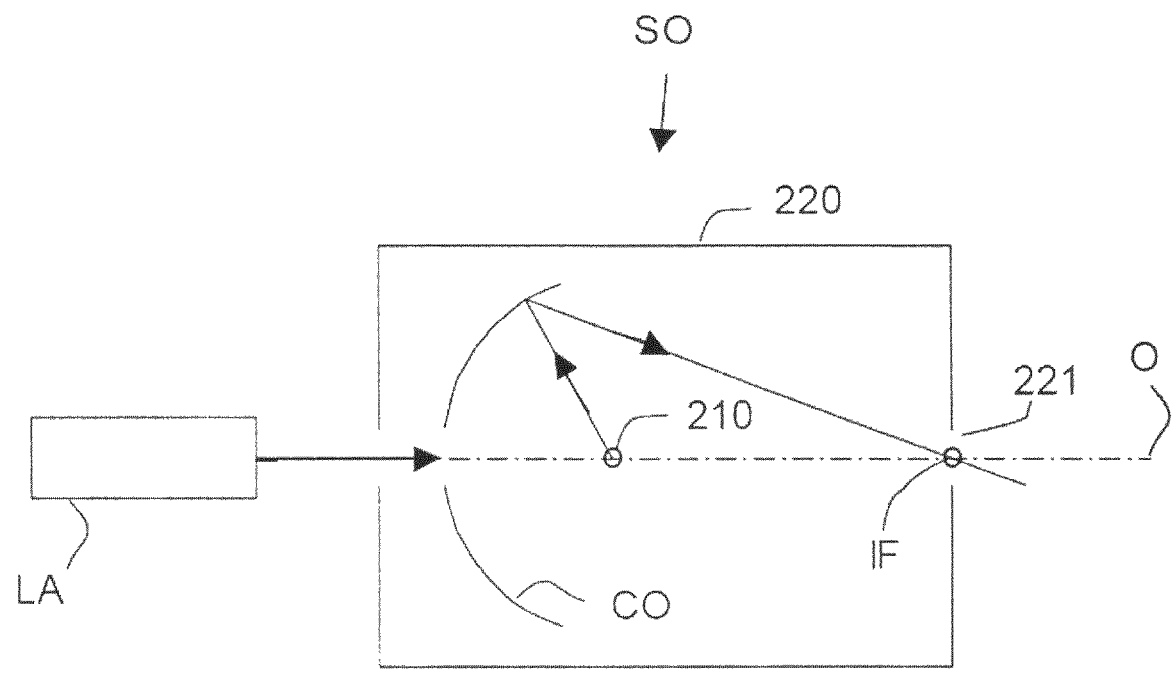
FIG. 15 is a more detailed view of the source collector module SO of the system of FIGS. 13 and 14.

Alternatively, the source collector module SO may be part of an LPP radiation system as shown in FIG. 15. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

U.S. Patent Application Publication No. U.S. 2013-0179847 is hereby incorporated by reference in its entirety.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated clauses:

1. A method, comprising: obtaining a layout specifying, at least in part, a pattern to be transferred to a substrate via a patterning process and an etch process; and modifying, with one or more processors, the layout to include an etch-assist feature that is larger than a resolution limit of the patterning process and smaller than a resolution limit of the etch process, the etch-assist feature being configured to reduce a bias of the patterning process or the etch process, to reduce an etch induced shift of a feature in the layout due to the etch process, or to expand a process window of another patterning process.

2. The method of clause 1, comprising: for a feature in the layout, determining that an etch bias attributable to the etch process would affect the transfer of the feature, wherein modifying the layout comprises modifying the layout to reduce the etch bias by placing the etch-assist feature adjacent the feature in the layout.

3. The method of clause 2, wherein: the etch process comprises a dry etch process, and determining that the etch bias would affect the transfer comprises estimating etch bias attributable to microloading adjacent the feature in the layout in the dry etch process.

4. The method of any of clauses 1 to 3, comprising: selecting a feature in the layout based on estimated film stress in resist patterned with the patterning process, wherein modifying the layout comprises positioning the etch-assist feature in a region that would otherwise be subject to the estimated film stress to reduce distortion of resist at least partially defining the selected feature.

5. The method of any of clauses 1 to 3, comprising: selecting a feature in the layout based on estimated sidewall distortion in resist patterned with the patterning process, wherein modifying the layout comprises shielding the feature in the layout with the etch-assist feature to reduce sidewall distortion of resist at least partially defining the selected feature.

6. The method of any of clauses 1 to 5, comprising: selecting a feature in the layout based on estimated pattern shift of the feature arising in the etch process, wherein modifying the layout comprises positioning the etch-assist feature in a region that at least partially interrupts the pattern shift.

7. The method of any of clauses 1 to 6, wherein the etch process includes a two-step etch process including etching of a hardmask before etching of a film underlying the hardmask, and wherein the etch-assist feature is configured to transfer to the hardmask during etching of the hardmask but not to the film underlying the hardmask.

8. The method of any of clauses 1 to 7, wherein modifying the layout comprises: obtaining a thickness of a film to be etched during the etch process; obtaining a value indicative of an anisotropy of at least part of the etch process; and sizing and/or (which is not to imply that other uses of the term "or" are exclusive or's) positioning the etch-assist feature based on the film thickness and the value.

9. The method of any of clauses 1 to 8, comprising: determining parameters of a filter for defect metrology of the substrate before the etch process is complete to reduce false-positive identification of defects from the etch-assist feature.

10. The method of any of clauses 1 to 9, wherein modifying the layout comprises sizing and positioning the etch-assist feature based on both photoresist-to-hardmask etch bias and hardmask etch bias.

11. The method of any of clauses 1 to 10, wherein a width of the etch-assist feature is configured to cause, over at least most of the substrate, the etch-assist feature to thin but not penetrate an etch masking layer.

12. The method of any of clauses 1 to 11, comprising: after modifying the layout, further modifying the layout to include optical proximity correction features configured to affect the patterning process.

13. The method of any of clauses 1 to 12, comprising: obtaining a reticle based on the modified layout; performing the patterning process on production substrates using the reticle; performing the etch process on the production substrates; and forming a plurality electronic, optical, or mechanical products, or combinations thereof, on the production substrate including a layer patterned with the patterning process and the etch process.

14 The method of any of clauses 1 to 12, wherein the etch-assist feature is configured to expand a process window of another patterning process.

15. A system, comprising: one or more processors; memory storing instructions that when executed by at least some of the processors effectuate operations comprising: obtaining a layout specifying, at least in part, a pattern to be transferred to a substrate via a patterning process and an etch process; and modifying, with one or more processors, the layout to include an etch-assist feature that is larger than a resolution limit of the patterning process and smaller than a resolution limit of the etch process, the etch-assist feature being configured to reduce a bias of the patterning process or the etch process, or to reduce an etch induced shift of a feature in the layout due to the etch process.

16. The system of clause 15, the operations comprising: for a feature in the layout, determining that an etch bias attributable to the etch process would affect the transfer of the feature, wherein modifying the layout comprises modifying the layout to reduce the etch bias by placing the etch-assist feature adjacent the feature in the layout.

17. The system of clause 16, wherein: the etch process comprises a dry etch process, and determining that the etch bias would affect the transfer comprises estimating etch bias attributable to microloading adjacent the feature in the layout in the dry etch process.

18. The system of any of clauses 15 to 17, the operations comprising: selecting a feature in the layout based on estimated film stress in resist patterned with the patterning process, wherein modifying the layout comprises positioning the etch-assist feature in a region that would otherwise be subject to the estimated film stress to reduce distortion of resist at least partially defining the selected feature.

19. The system of any of clauses 15 to 18, the operations comprising: selecting a feature in the layout based on estimated sidewall distortion in resist patterned with the patterning process, wherein modifying the layout comprises shielding the feature in the layout with the etch-assist feature to reduce sidewall distortion of resist at least partially defining the selected feature.

20. The system of any of clauses 15 to 19, the operations comprising: selecting a feature in the layout based on estimated pattern shift of the feature arising in the etch process, wherein modifying the layout comprises positioning the etch-assist feature in a region that at least partially interrupts the pattern shift.

21. The system of any of clauses 15 to 20, wherein the etch process includes a two-step etch process including etching of a hardmask before etching of a film underlying the hardmask, and wherein the etch-assist feature is configured to transfer to the hardmask during etching of the hardmask but not to the film underlying the hardmask.

22. The system of any of clauses 15 to 21, wherein modifying the layout comprises: obtaining a thickness of a film to be etched during the etch process; obtaining a value indicative of an anisotropy of at least part of the etch process; and sizing or positioning the etch-assist feature based on the film thickness and the value.

23. The system of any of clauses 15 to 22, the operations comprising: determining parameters of a filter for defect metrology of the substrate before the etch process is complete to reduce false-positive identification of defects from the etch-assist feature.

24. The system of any of clauses 15 to 23, wherein modifying the layout comprises sizing and positioning the etch-assist feature based on both photoresist-to-hardmask etch bias and hardmask etch bias.

25. The system of any of clauses 15 to 24, wherein a width of the etch-assist feature is configured to cause, over at least most of the substrate, the etch-assist feature to thin but not penetrate an etch masking layer.

26. The system of any of clauses 15 to 25, the operations comprising: after modifying the layout, further modifying the layout to include optical proximity correction features configured to affect the patterning process.

27. The system of any of clauses 1526, comprising: a manufacturing facility including the one or more processors and the memory, the manufacturing facility comprising: a reticle based on the modified layout; a patterning apparatus configured to perform the patterning process on production substrates using the reticle; an etch chamber configured to perform the etch process on the production substrates; and a plurality of other semiconductor manufacturing equipment configured to form a plurality electronic, optical, or mechanical products, or combinations thereof, on the production substrate including a layer patterned with the patterning process and the etch process.

28. The system of any of clauses 15 to 27, wherein the etch-assist feature is configured to expand a process window of another patterning process.

29. A tangible, non-transitory, machine readable media storing instructions that when executed by a data processing apparatus effectuate operations comprising: the operations of any of clauses 1 to 14.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

The invention claimed is:

1. A method, comprising:
obtaining a layout specifying, at least in part, a pattern to be transferred to a substrate via a patterning process and an etch process; and
modifying, with one or more processors, the layout to include an etch-assist feature for formation in a resist layer, the etch-assist feature in the resist layer being larger than a resolution limit of the patterning process and smaller than a resolution limit of the etch process applied to the resist layer, and the etch-assist feature being configured to reduce a bias of the patterning process or the etch process, to reduce an etch induced shift of a feature in the layout due to the etch process, or to expand a process window of another patterning process.

2. The method of claim 1, further comprising for a feature in the layout, determining that an etch bias attributable to the etch process would affect the transfer of the feature, wherein modifying the layout comprises modifying the layout to reduce the etch bias by placing the etch-assist feature adjacent the feature in the layout.

3. The method of claim 2, wherein:
the etch process comprises a dry etch process, and
determining that the etch bias would affect the transfer comprises estimating etch bias attributable to microloading adjacent the feature in the layout in the dry etch process.

4. The method of claim 1, further comprising selecting a feature in the layout based on estimated film stress in resist of the resist layer patterned with the patterning process, wherein modifying the layout comprises positioning the etch-assist feature in a region that would otherwise be subject to the estimated film stress to reduce distortion of resist at least partially defining the selected feature.

5. The method of claim 1, further comprising selecting a feature in the layout based on estimated sidewall distortion in resist of the resist layer patterned with the patterning process, wherein modifying the layout comprises shielding the feature in the layout with the etch-assist feature to reduce sidewall distortion of resist at least partially defining the selected feature.

6. The method of claim 1, further comprising selecting a feature in the layout based on estimated pattern shift of the feature arising in the etch process, wherein modifying the layout comprises positioning the etch-assist feature in a region that at least partially interrupts the pattern shift.

7. The method of claim 1, wherein the etch process includes a two-step etch process including etching of a hardmask before etching of a film underlying the hardmask, and wherein the etch-assist feature is configured to transfer to the hardmask during etching of the hardmask but not to the film underlying the hardmask.

8. The method of claim 1, wherein modifying the layout comprises:
obtaining a thickness of a film to be etched during the etch process;
obtaining a value indicative of an anisotropy of at least part of the etch process; and
sizing and/or positioning the etch-assist feature based on the film thickness and the value.

9. The method of claim 1, further comprising determining a parameter of a filter for defect metrology of the substrate before the etch process is complete to reduce false-positive identification of defects from the etch-assist feature.

10. The method of claim 1, wherein modifying the layout comprises sizing and positioning the etch-assist feature based on both photoresist-to-hardmask etch bias and hardmask etch bias.

11. The method of claim 1, wherein a width of the etch-assist feature is configured to cause, over at least most of the substrate, the etch-assist feature to thin but not penetrate an etch masking layer.

12. The method of claim 1, further comprising, after modifying the layout, further modifying the layout to include optical proximity correction features configured to affect the patterning process.

13. The method of claim 1, further comprising:
obtaining a reticle based on the modified layout;

performing the patterning process on production substrates using the reticle;

performing the etch process on the production substrates; and forming a plurality electronic, optical, or mechanical products, or a combination thereof, on the production substrate including a layer patterned with the patterning process and the etch process.

14. The method of claim 1, wherein the etch-assist feature is configured to expand a process window of another patterning process.

15. A system, comprising:
one or more processors;
memory storing instructions that when executed by at least some of the processors effectuate operations comprising:
obtaining a layout specifying, at least in part, a pattern to be transferred to a substrate via a patterning process and an etch process; and
modifying, with one or more processors, the layout to include an etch-assist feature for formation in a resist layer, the etch-assist feature in the resist layer being larger than a resolution limit of the patterning process and smaller than a resolution limit of the etch process applied to the resist layer, and the etch-assist feature being configured to reduce a bias of the patterning process or the etch process, to reduce an etch induced shift of a feature in the layout due to the etch process, or to expand a process window of another patterning process.

16. A computer program product comprising a non-transitory computer-readable medium having instructions therein, the instruction, upon execution by a computer system, configured to cause the computer system to at least:
obtain a layout specifying, at least in part, a pattern to be transferred to a substrate via a patterning process and an etch process; and
modify the layout to include an etch-assist feature for formation in a resist layer, the etch-assist feature in the resist layer being larger than a resolution limit of the patterning process and smaller than a resolution limit of the etch process applied to the resist layer, and the etch-assist feature being configured to reduce a bias of the patterning process or the etch process, to reduce an etch induced shift of a feature in the layout due to the etch process, or to expand a process window of another patterning process.

17. The computer program product of claim 16, wherein the instructions are further configured to, for a feature in the layout, determine that an etch bias attributable to the etch process would affect the transfer of the feature and the instructions configured to cause the computer system to modify the layout are further configured to cause the computer system to modify the layout to reduce the etch bias by placing the etch-assist feature adjacent the feature in the layout.

18. The computer program product of claim 16, wherein the instructions are further configured to select a feature in the layout based on estimated film stress in resist of the resist layer patterned with the patterning process and the instructions configured to cause the computer system to modify the layout are further configured to cause the computer system to position the etch-assist feature in a region that would otherwise be subject to the estimated film stress to reduce distortion of resist at least partially defining the selected feature.

19. The computer program product of claim 16, wherein the instructions are further configured to select a feature in the layout based on estimated sidewall distortion in resist of the resist layer patterned with the patterning process and the instructions configured to cause the computer system to modify the layout are further configured to cause the computer system to shield the feature in the layout with the etch-assist feature to reduce sidewall distortion of resist at least partially defining the selected feature.

20. The computer program product of claim 16, wherein the instructions are further configured to select a feature in the layout based on estimated pattern shift of the feature arising in the etch process and the instructions configured to cause the computer system to modify the layout are further configured to cause the computer system to position the etch-assist feature in a region that at least partially interrupts the pattern shift.

21. The computer program product of claim 16, wherein a width of the etch-assist feature is configured to cause, over at least most of the substrate, the etch-assist feature to thin but not penetrate an etch masking layer.

* * * * *